US006075901A

United States Patent [19]

Signes et al.

[11] Patent Number: 6,075,901
[45] Date of Patent: Jun. 13, 2000

[54] METHOD AND SYSTEM FOR PREDICTIVE ENCODING OF ARRAYS OF DATA

[75] Inventors: Julien Signes, San Francisco, Calif.; Olivier Ondet, Paris, France

[73] Assignee: France Telecom, Issy Moulineaux Cedex, France

[21] Appl. No.: 09/205,191

[22] Filed: Dec. 4, 1998

[51] Int. Cl.$^7$ ...................................................... G06K 9/00
[52] U.S. Cl. ............................................. 382/251; 382/238
[58] Field of Search ..................... 382/232, 233, 382/234, 235, 236, 238, 239, 240, 241, 242, 243, 244, 248, 249, 250, 251, 252, 253; 386/81, 68, 124, 109, 113; 348/397, 76, 384, 416, 405, 390, 699, 403, 408; 600/109; 708/203, 290, 400, 420

[56] References Cited

U.S. PATENT DOCUMENTS 4,751,742   6/1988   Meeker ..................................... 382/41
5,227,878   7/1993   Puri et al. ............................... 358/136

Primary Examiner—Bijan Tadayon
Attorney, Agent, or Firm—Oblon, Spivak, McClelland, Maier & Neustadt, P.C.

[57] ABSTRACT

A method and system for uniformly encoding arrays of values in a video stream. Using a data type of an element to be encoded, a predictive value is quantized and encoded as part of a video stream. The resulting video stream efficiently encodes rotations, normals, and vectors.

3 Claims, 3 Drawing Sheets

| Initial data : 128 bits for each rotation | |

Figure 3B

| 27 bits | 27 bits | 27 bits | 27 bits |

Figure 3C

| 27 bits | 12 b | 12 b | 12 b |

METHOD AND SYSTEM FOR PREDICTIVE ENCODING OF ARRAYS OF DATA

CROSS-REFERENCE TO RELATED APPLICATIONS

The present application is related to the co-pending application entitled "Method and System for Encoding Rotations and Normals in 3D Generated Scenes," Ser. No. 09/205,190, filed Dec. 4, 1998, also naming Julien Signes and Olivier Ondet as inventors. The contents of that co-pending application are incorporated herein by reference.

BACKGROUND OF THE INVENTION

1. Field of the Invention

The present invention relates to the encoding of computer-generated images, and more particularly to a unified coding method for arrays of data, independent of the function of the data. Accordingly, arrays of position data, rotations, and normals are encoded consistently.

2. Discussion of the Background

The phrase "computer-generated images" encompasses an expanding area of video technology. Originally the term was often equated with simple text images or 2D images; however, the phrase now encompasses any type of digitally encoded video stream. The Motion Pictures Expert Group (MPEG) was formed to investigate the technologies required for the encoding and decoding of image streams. The resulting standard (now referred to as "MPEG-1") has served as a basis for two additional MPEG standards: MPEG-2 and MPEG-4. MPEG-4 is a standard that is "in progress" and forms the basis for the present invention. The final committee drafts are ISO/IEC FCD 14496-1 MPEG-4 Systems and -2 MPEG-4 Visual, the contents of the final committee drafts are incorporated herein by reference.

The draft standard departs from the single stream-based model of video and changes the focus to a series of streams that act in concert. One portion of the standard is the Binary Format for Scenes (also known as "BIFS"). This format allows the description of 3D objects and their motion and provides the ability for greater interaction with that portion of the video stream. The draft standard for MPEG-4 BIFS proposes to encode multiple data fields by a linear quantization process, which does not account for the correlation within those multiple fields. Thus, MPEG-4 BIFS does not describe predictive encoding of arrays.

Another proposed graphics format is the Compressed Binary Format for Virtual Reality Markup Language (hereinafter "CBF VRML") that includes an encoding method that is applicable only to a few fields of a few nodes and for a limited subset of data types. The fourth and fifth drafts of the CBF VRML standard, dated Aug. 22, 1997 and Oct. 15, 1997, respectively, are available from www.vrml.org and are incorporated herein by reference. Likewise, the Revised Requirements Statement for CBF VRML97, dated Apr. 3, 1998, is also incorporated herein by reference.

Yet another graphics format is the Tag Image File format (TIFF). The contents of version 6.0 of the TIFF specification are incorporated herein by reference. Each entry in a TIFF file is stored as four parts: (1) a tag, (2) a type identifier, (3) a count, and (4) one or more values. Page 16 of the version 6.0 specification states that "all fields are actually one-dimensional arrays, even though most fields contain only a single value." Moreover, although page 16 also states that there may be multiple images per file, the specification is designed for independently coded 2D images rather than streaming 3D images.

SUMMARY OF THE INVENTION

It is an object of the present invention to address the coding inefficiencies of known MPEG-4 BIFS data streams.

It is a further object of the present invention to provide a method and system for encoding arrays of data, representing a scene or object(s), using a temporal predictive encoding process.

This and other objects of the present invention are addressed by one or more of (1) a computer-implemented method for uniformly encoding arrays of values, (2) a system for uniformly encoding arrays of values, and (3) a computer program product for uniformly encoding arrays of values. Such a system is applicable to improved storage and playback of games, virtual reality environments, and movies. Moreover, based on the improved efficiency, video streams encoded according to the present invention may be played back over lower bandwidth communications links than less efficiently encoded streams.

BRIEF DESCRIPTION OF THE DRAWINGS

A more complete appreciation of the invention and many of the attendant advantages thereof will become readily apparent with reference to the following detailed description, particularly when considered in conjunction with the accompanying drawings, in which.

DESCRIPTION OF THE PREFERRED EMBODIMENTS

Figure 1:
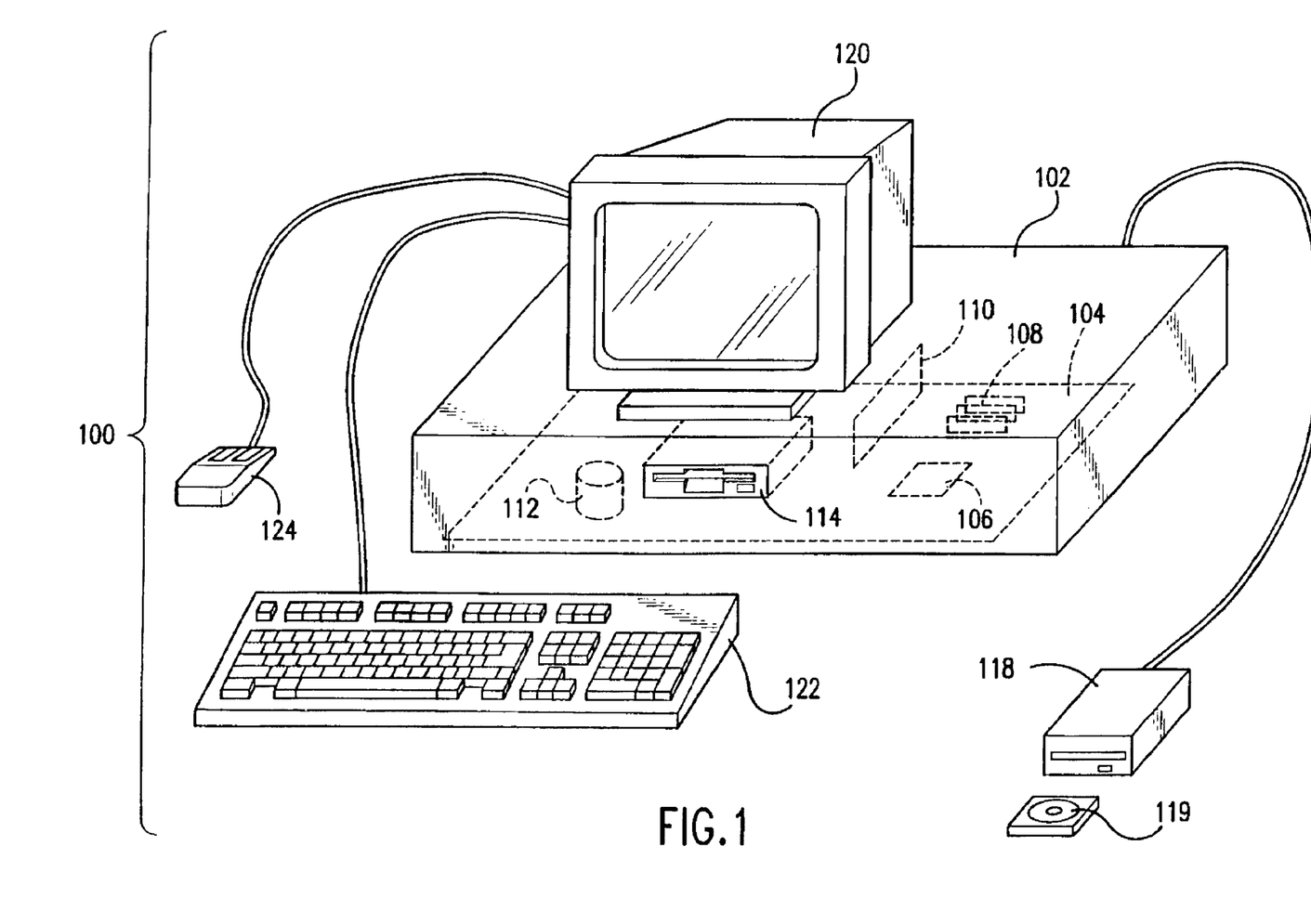
FIG. 1 is a schematic illustration of a computer for providing encoding and/or decoding services of the present invention.

Referring now to the drawings, wherein like reference numerals designate identical or corresponding parts throughout the several views, FIG. 1 is a schematic illustration of a computer system for uniformly encoding and/or decoding arrays of values. A computer 100 implements the method of the present invention, wherein the computer housing 102 houses a motherboard 104 which contains a CPU 106, memory 108 (e.g., DRAM, ROM, EPROM, EEPROM, SRAM, SDRAM, and Flash RAM), and other optional special purpose logic devices (e.g., ASICs) or configurable logic devices (e.g., GAL and reprogrammable FPGA). The computer 100 also includes plural input devices, (e.g., a keyboard 122 and mouse 124), and a display card 110 for controlling monitor 120. In addition, the computer system 100 further includes a floppy disk drive 114; other removable media devices (e.g., compact disc 119, tape, and removable magneto-optical media (not shown)); and a hard disk 112, or other fixed, high density media drives, connected using an appropriate device bus (e.g., a SCSI bus, an Enhanced IDE bus, or a Ultra DMA bus). Also connected to the same device bus or another device bus, the computer 100 may additionally include a compact disc reader 118, a compact disc reader/writer unit (not shown) or a compact disc jukebox (not shown). Although compact disc 119 is shown in a CD caddy, the compact disc 119 can be inserted directly into CD-ROM drives that do not require caddies. In addition, a printer (not shown) also provides printed listings of encoded and/or decoded arrays.

As stated above, the system includes at least one computer readable medium. Examples of computer readable media are compact discs 119, hard disks 112, floppy disks, tape, magneto-optical disks, PROMs (EPROM, EEPROM, Flash EPROM), DRAM, SRAM, SDRAM, etc. Stored on any one or on a combination of computer readable media, the present invention includes software for controlling both the hardware of the computer 100 and for enabling the computer 100 to interact with a human user. Such software may include, but is not limited to, device drivers, operating systems and user applications, such as development tools. Such computer readable media further includes the computer program product of the present invention for uniformly encoding and/or decoding arrays in scene descriptions and/or animations. The computer code mechanisms/devices of the present invention can be any interpreted or executable code mechanism, including but not limited to scripts, interpreters, dynamic link libraries, Java classes, and complete executable programs.

Figure 2:
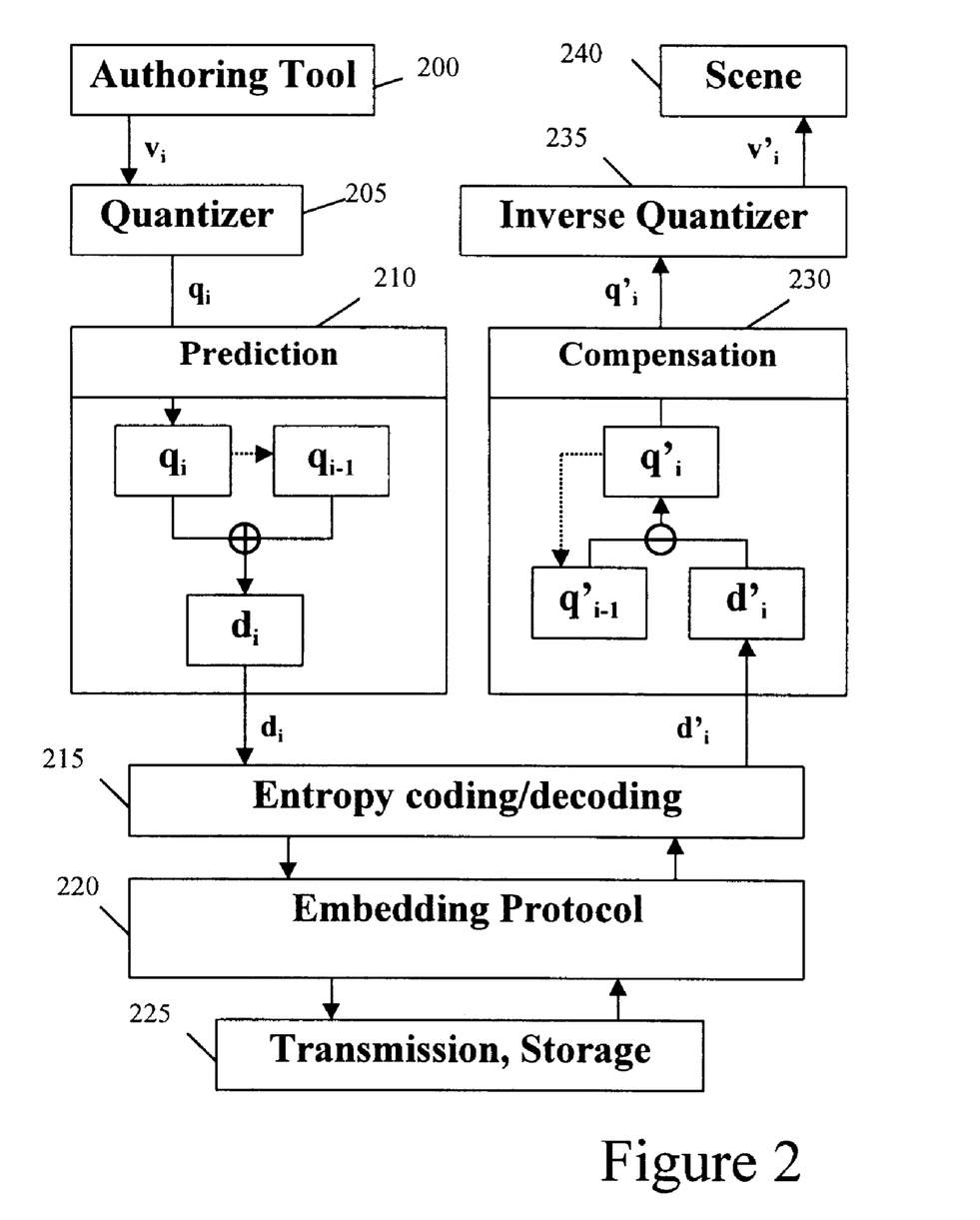
FIG. 2 is a schematic illustration of an encoder/decoder system.

As shown in FIG. 2, an authoring tool 200 is used in the first step of creating a scene 240. Once the authoring tool 200 has created a series of images, the series of images are sent to a quantizer 205. After quantization, the quantized images are sent to a predictor 210 that utilizes similarities between an earlier frame and a later frame to more compactly represent the contents of the later frame through differential encoding. The predictor may include linear or non-linear (i.e., multiple order) interpolation. The differences between frames are encoded by the entropy encoder/decoder 215. Encoder/decoder 215 may be any one of a number of entropy systems (e.g., an adaptive arithmetic encoder). The results of the encoder/decoder 215 are formatted by the embedding protocol 220 and either transmitted or stored using a transmitter or storage device 225.

To decode the formatted, stored/transmitted images, the encoding process in "undone" in reverse. First, the formatting is decoded by the embedding protocol 220 to produce the original entropy encoded data. The entropy-encoded data are fed to a decoder 230 that includes a compensator. The compensator utilizes earlier frames and the differential encodings to produce the frames of quantized data. The quantized data is sent to an inverse quantizer 235 which inverse quantizes the data into the scene. Due to the number of bits used in the quantization process, the scene may not be a perfect representation of the original scene authored, but, by using the present invention, arrays are more efficiently encoded so that additional bits may be used for other purposes (e.g., higher resolution quantization).

For the purpose of clarity, authoring is described hereinafter as being performed to create a series of animation parameters, v. An arbitrary parameter, $v_i$, is the $i^{th}$ parameter in the series and may itself contain an array of real values. During quantization, the parameters, $v_i$ are converted to quantized parameters, $vq_i$. One example of a quantization method is linear uniform quantization as is described in described in MPEG-4 BIFS version 1.

Such a quantization process supports the compensation process described hereinafter in which prediction of values is extended to all values types. One or more prediction functions are defined for each data type so that values of that data type can be predicted. In an alternate embodiment, one prediction function (e.g., addition) is used for all data types. As a result of prediction, during decoding, generally fewer bits are needed to recreate the intended scene.

Figure 3A:
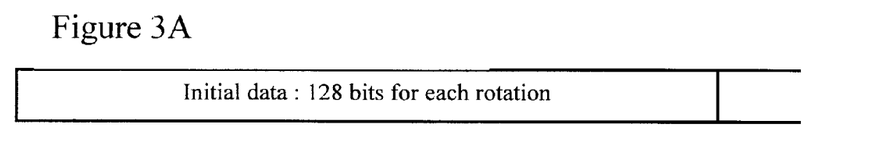
FIG. 3A is an illustration of an original bit-length used to encode a rotation in 128 bits.
Figure 3B:
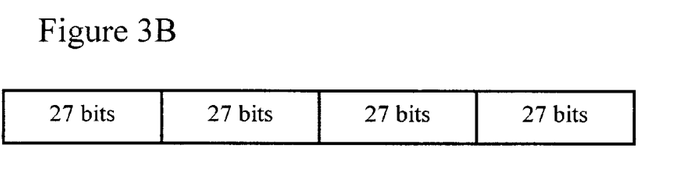
FIG. 3B is an illustration of the result of using a known quantization and encoding method that uses 8-bit quantization to encode a series of rotations in 27 bits each.
Figure 3C:
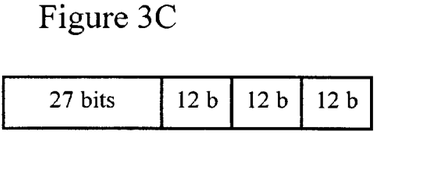
FIG. 3C is an illustration of the result of using the quantization and predictive encoding method according to the present invention—i.e., using 8-bit quantization and 4-bit predictive encoding (1) to encode a first rotation in 27 bits and (2) to encode a series of subsequent rotations in 12 bits each.

The coding method described hereinafter is a generalized and uniform predictive coding method that applies to all types of arrays of data in a scene. Thus, the method is applicable to intra-frame encodings (i.e., I-mode) and predictive encodings (i.e., P-mode). In an alternate embodiment, in P-mode, a variable length encoder is used to further reduce the data size. As shown in FIGS. 3A–3C, when applied to rotations, the encoding of data can be accomplished in fewer bits than without quantization, and can be accomplished with even fewer bits yet when combined with predictive encoding.

Additional types of data also can be addressed. Any 2D or 3D parameter, v, can be seen as a vector of real values of dimension D given by:

$$v=(v[0],v[1],\ldots,v[D-1]).$$

The corresponding quantized value of this parameter is an array of integers of dimension D' given by:

$$q=(q[0],q[1],\ldots,q[D'-1]),$$

where the dimension D' is not necessarily equal to D. Vectors, unit vectors, and integers comprise three specific categories of parameters that are encoded according to the predictive, quantized encoding of the present invention.

The group "vectors" is partitioned into three-dimensional, two-dimensional and one-dimensional vectors. Three-dimensional vectors are used to encode values of types: Position3D, Size 3D, and Texture Coordinate. Two-dimensional vectors are used to encode values of types: Position2D, Size 2D, and Texture Coordinate. One-dimensional vectors are floats that encode any single, non-integer value. That is, a floating point array of length 1 is used to encode values of types Angle, Scale, Interpolator keys, and BoundFloat. Colors are also a special form of floating point three-dimensional vectors with the red, green and blue components each being represented on a scale of 0.0–1.0. Based on the MPEG-4 BIFS v1 specification, vectors are used for categories where QuantTypes and AnimationTypes are 1, 2, 4, 5, 6, 7, 8, 11 and 12.

As a result of the special properties of unit vectors, unit vectors are separately addressed and are used for normals and rotations (QuantTypes and AnimationTypes 9 and 10). Additional details of the use of rotations and normals are disclosed in the above-identified co-pending patent application.

The last category, integers, is also subject to predictive, quantized, encodings. Based on the MPEG4 BIFS v1 specifications, this category matches QuantTypes and AnimationTypes 3, 13 and 14. For reference, a more complete description of the categories are set forth below in Tables 1 and 2.

TABLE 1

QuantTypes (Quantization Categories)

| Category | Description |
|---|---|
| 0 | None |
| 1 | 3D Position |
| 2 | 2D positions |
| 3 | drawOrder |
| 4 | SFColor |
| 5 | Texture Coordinate |
| 6 | Angle |
| 7 | Scale |
| 8 | Interpolator keys |
| 9 | Normals |
| 10 | Rotations |
| 11 | Object Size 3D |
| 12 | Object Size 2D |
| 13 | Linear Scalar Quantization |
| 14 | CoordIndex |
| 15 | Reserved |

TABLE 2

AnimTypes

| Category | Description |
|---|---|
| 0 | None |
| 1 | Position 3D |
| 2 | Positions 2D |
| 3 | Reserved |
| 4 | Color |
| 5 | Reserved |
| 6 | Angle |
| 7 | Float |
| 8 | BoundFloat |
| 9 | Normals |
| 10 | Rotation |
| 11 | Size 3D |
| 12 | Size 2D |
| 13 | Integer |
| 14 | Reserved |
| 15 | Reserved |

The Quantization/Inverse Quantization process is specified by several parameters. These parameters depend on the general category of the coded parameter. For vectors, the Quantizer/Inverse Quantizer should be supplied with:

QuantMin: The minimal bounds of quantization for the vector—coded as an array of floating point numbers ("floats") of the same dimension as the dimension D of the parameter.

QuantMax: The upper bounds of quantization for the vector—coded as an array of floats of the same dimension as the dimension D of the parameter.

QuantNbBits: The number of bits used in the vector quantization.

For certain categories (such as Colors or naturally Bound Floats), the QuantMin and QuantMax value may be obtained from the default (finite) bounds of the parameter. In an alternate embodiment, a quantization step is specified instead of QuantMax; such that:

QuantStep=(QuantMax−QuantMin)/((2^(QuantNbBits))−1)

Similarly, for unit vectors, the encoder/decoder is only supplied with one encoding parameter, QuantNbBits—i.e., the number of bits used in the vector quantization. For consistency, the floats QuantMin and QuantMax are defined as 0 and 1, respectively.

For integers, the Quantizer/Inverse Quantizer is supplied with:

QuantMin: The lower bounds of quantization for the vector—coded as an integer.

QuantNbBits: The number of bits used in the vector quantization.

The elementary quantization process quantizes real values according to three parameters:

QuantMin: The minimum quantization value

QuantMax: The maximum quantization value

QuantNbBits: The number of bits used by the quantization.

A quantization step then can be defined according to:

QuantNbBits $\leq$ 0   QuantStep has no real meaning, and the quantized value is simply set to 0.

QuantNbBits $>$ 0   $\text{QuantStep} = \dfrac{\text{QuantMax} - \text{QuantMin}}{2^{\text{QuantNbBits}} - 1}$ The elementary quantization process is then defined by the following function (in the C programming language style):

int quantize (float QuantMin, float QuantMax, float v, int QuantNbBits) returns the rounded value of (v-QuantMin)/QuantStep Accordingly, the elementary inverse quantization process is defined by the following function:

float invQuantize (float QuantMin,float QuantMax, float vq,int QuantNbBits) returns (QuantMin+vq*QuantStep)

The quantization process described in MPEG4 BIFS v1 utilises quantization and inverse quantization functions such as those described above and is applicable to the present invention. Other quantization and inverse quantization functions may be used in alternate embodiments as long as the quantization process supports a compensation process as well.

As part of the compensation process, the following parameters are defined:

CompMin: An array of integers that define the lower bound of the compensation vector, vDelta.

CompNbBits: An integer that defines the number of bits used to code the components of the compensation vector.

These values are not specific properties of the compensator, but define the encoding of the components of the compensation vector vDelta in the binary file. Each component vDelta[i] is translated by CompMin[i] and coded using CompNbBits. The actual coded value is then: vDelta[i]−CompMin[i].

The general prediction process will now be described in terms of successive quantized values vq1, vq2 and the delta value between them vDelta.

The encoding process will first be described. For vectors and integers, the calculation is straightforward and given by:

vDelta[$i$]=v$q$2 [$i$]−v$q$1[$i$].

For unit vectors, a more detailed calculation is utilized (and is discussed in greater detail in the above-identified co-pending application). As discussed above, if QuantNbBits=0, then there is no actual coding since no bits are available for use. In that case, all values are assumed to be zero and need not be written to a video stream.

However, when QuantNbBits>0, the coding process is performed as follows. First the variable inv is initially set to one (but this variable may change during the process). Then, the number, N, of reduced components is determined, where N=2 for normals and N=3 for rotations. Then, the differential orientations and directions between vq1 and vq2 are computed based on:

$$dOri = (ori2 - ori1) mod(N + 1)$$
$$dDir = dir1 * dir2$$
$$scale = 2^{QuantNbBits-1} - 1.$$

Then there are two cases to consider:

| | |
|---|---|
| dOri = 0 | vDelta is defined by: |
| | vDelta[i] = vq2[i] − vq1[i] |
| dOri ≠ 0 | Let dist = vq2[N−dOri] + vq1[dOri−1] |
| | if dist < 0 inv = −1 |
| | vDelta is then defined by |
| | 0 ≤ i < dO     vDelta[i] = inv*vq2[i−dOri−1] − vq[i] |
| | i = dOri−1     vDelta[i] = inv*2*scale − dist |
| | dOri ≤ i <     vDelta[i] = inv*vq2[i−dOri] − vq1[i] |

The variable inverse calculated according to inverse= inv*dDir. As a result of the marginal non-injectivity of the quantization process, vq2', the compensation of vq1 by vDelta may not yield exactly vq2. However, vq2 and vq2' will always represent nearly the same normal or rotation.

Each of the three basic categories of values (i.e., integers, vectors, and unit vectors) can be predicted. Integers are predicted using simple subtraction. Vectors utilize a quantized-component-based subtraction for prediction. Unit vectors use a specialized subtraction based on the topological structure of the mapping cube.

Having predicted values for each data type, compensation is used during decoding to correct for differences between the predicted and actual values. Let vq1 be the previously computed quantized parameter, vDelta the delta value and vq2 be the quantized value resulting from the addition. It then follows that a quantized value vq contains an array of integers vq[]. Additionally, for normals and rotations, vq1 contains an orientation and, for normals only, a direction. Similarly, a delta value vDelta contains an array of integers vDelta[]. Additionally, for normals, it contains an integer inverse whose value is −1 or 1. The result vq2 is then computed depending on the type of value being calculated. For vectors and integers, the components of vq2 are given by:

$$vq2[i]=vq1[i]+vDelta[i]$$

For unit vectors, however, additional processing is performed because of the unit cube structure.

As described above, the following method is performed. First a component-by-component addition is performed, and the results are stored in a temporary array given by:

$$vqTemp[i]=vq1[i]+vDelta[i].$$

If QuantNbBits is zero or 1, scale is set to ½, otherwise, scale is set to $2^{QuantNbBits-1}-1$. As described in greater detail in the co-pending application, the use of QuantNbBits=0 is essentially equivalent to the QuantNbBits=1 for the present invention. By using the direction and orientation information alone (i.e., when QuantNbBits=0), movement from one face to every other can be described.

However, in the more common cases described below, QuantNbBits>=2. Then, N, the number of reduced components, is set (where N=2 for normals and N=3 for rotations). Once those initial steps are performed, additional processing is performed as described below, depending on which of the three conditions are met.

| | |
|---|---|
| (1) For every index i, \|vqTemp[i]\| ≤ scale | vq2 is defined by, vq2[i] = vqTemp[i] orientation2 = orientation1 direction2 = direction1 * inverse |
| (2) There is one and only one index k such that \|vqTemp[k]\| > scale | vq2 is rescaled as if gliding on the faces of the mapping cube. Let inv = 1 if vqTemp[k] >= 0 and −1 else Let dOri = k + 1 The components of vq2 are computed as follows 0 ≤ i < N−dOri   vq2[i] = inv*vqTemp[(i + dOri) mod N] i = N−dOri   vq2[i] = inv*2*scale − vqTemp[dOri−1] N−dOri < i < N   vq2[i] = inv*vqTemp[(i + dOri−1) mod N] orientation2 = (orientation1 + dOri) mod (N + 1) direction2 = direction1 * inverse * inv |
| (3) There are several indices k such that \|vqTemp[k]\| > scale | The result is undefined |

For each of the three type of values (i.e., integers, vectors, and unit vectors), the compensation process reverses the predictive process. Thus, for integers a simple addition process undoes the predictive subtraction. Likewise, for vectors a quantized-component-based addition is used. Lastly, a topologically coherent addition is used for unit vectors, potentially requiring computation of a new orientation and direction.

As described with reference to FIG. 2, once the encoder 215 has completed entropy encoding, the resulting values must be stored, along with header information, in the format specified by the protocol. Thus, one embodiment utilizes the following structure (although other structures are also possible). First each field of each node is given a parameter category, that describes which QuantMin, QuantMax, QuantNbBits, CompMin, CompNbBits are to be used, according to the previously described process. Then a header for each array is coded. The header includes:

(1) a length of the field, and
(2) a policy for I-mode (i.e., simple quantization) and P-mode given one of the following three categories: (a) a single Intra value is followed by only Predictive coded values, (b) an I-value is provided for each n p-values (thereby limiting the length of the propagation of an error), and (c) a bit precedes (or follows) each value to signify whether the value is an I-value or a P-value.

Then the quantization and compensation parameters for coding predictive values are added to the stream. Intra quantization parameters (QuantMin, QuantMax, QuantNbBits) can be retrieved in BIFS by the corresponding QuantizationParameter in the scope of the encoded field. The compensation parameters (CompMin, CompNbBits) are added directly to the stream.

Lastly, the array of quantized values is coded, following the Intra/predictive policy. I-values are coded as quantized values. P-values are encoded through an arithmetic adaptive encoder whose session is opened between any two Intras.

The bitstream syntax below is used to code the array of values. The bitstream syntax uses conventions of the MSDL language as specified by MPEG-4 FDIS 14496-1.

$$vDelta(t) = v\_acc(t) + Pmin$$

$$vq(t) = AddDelta(vq(t-1), vDelta(t))$$

$$v(t) = InvQuant(vq(t))$$

The field's models are updated each time a value is decoded through the adaptive arithmetic coder. If the animType is 1 (Position3D) or 2 (Position2D), each component of the field's value is using its own model and offset PMin[i]. In all other cases the same model and offset PMin[0] is used for all the components.

As shown in Table 3 below, the compression of arrays of values according to the present invention can provide significant compression of scenes as compared to VRML ASCII files representing substantially similar video streams.

TABLE 3

| File | Vrml Scene File size (kB) | BIFS-Scene No Compensation | | BIFS-Scene with Compensation (estimation) | |
|---|---|---|---|---|---|
| | | File size (kB) | ratio | File size (kB) | ratio |
| Intro | 347 | 45 | 7.7 | 25 | 13.9 |
| Prolog | 621 | 81 | 7.7 | 48 | 12.9 |
| Movie1 | 968 | 103 | 9.4 | 65 | 14.9 |
| Finale | 412 | 58 | 7.1 | 35 | 11.8 |
| Movie2 | 117 | 13.2 | 8.9 | 9 | 13.0 |
| Skeleton | 34 | 2.9 | 11.7 | | |
| Floops | 1324 | 95 | 13.9 | 65 | 20.3 |
| Fishswim | 37 | 4.4 | 8.4 | | |
| Store | 155 | 14 | 11.1 | 9 | 17.2 |
| Tree | 80 | 4.9 | 16.3 | | |
| Channel10 | 100 | 2.9 | 34.5 | | |
| Meteo1 | 4.0 | 0.285 | 14.0 | | |
| Flight | 62 | 4.7 | 13.2 | | |

As would be evident to one of ordinary skill in the art, numerous modifications can be made based upon the teachings of the present invention. Accordingly, the examples and embodiments described above are not intended to be limiting but rather exemplary. Only the appended claims define the scope of protection to which applicants are entitled.

1.0 ArrayOfData

*1.1 Syntax*

```
class ArrayOfData{
        ArrayHeader    header;
        ArrayOfValues  values;
}
```

*1.2 Semantic*

The array of data is composed of a Header, and an ArrayOfValues

2.0 ArrayHeader

*2.1 Syntax*

```
class ArrayHeader{
    int(5)      NbBits;
    int(NbBits) numberOfFields;
    bit(2)      IPPolicy;
    if (IPPolicy == 1)
        int(NbBits) intraInterval;
    InitialArrayQP qp;
}
```

*2.2 Semantic*

The array header contains first information to specify the number of fields (NbBits is the number of bits used to code the numberOfFields). Then the Intra/Predictive policy (IPPolicy) is specified as follows:

If is is 0 : Only one Intra value at the beginning and then only predictive coded values If is is 1 : An Intra every given number of predictive values If is is 2 : An bit for each value to determine whether the value is an Intra or predictive value Lastly, the InitialArrayQP is coded.

3.0 InitialArrayQP

*3.1 Syntax*

```
class InitialArrayQP{
   switch (IPPolicy)
      case 1 :
         int         NbBits;
         int(NbBits) intraInterval;
         // no break
      case 0 :
      case 2 :
         int(5)      CompNbBits;
            for (int i=0;i<NbComp(quantType))
               int(QuantNbBits+1)   CompMin[i]
         // no break
      case 3:
         break;
}
```

*3.2 Semantic*

If IPPolicy is 1, the size of the interval between two intras is first specified. Independent of the IPPolicy, the number of Bits used in Predictive mode CompNbBits and the CompMins are coded. (The function NbComp() is a function that returns the number of components of the quantizing bounds, and depends on the object. For instance it returns 3 for 3D positions, 2 for 2D positions, and 3 for rotations.)

4.0 ArrayQP 4.1 *Syntax*

```
class ArrayQP{
   switch (intraMode)
      case 1 :
         int         NbBits;
         int(NbBits) intraInterval;
         // no break case 0 :
      case 2 :
         boolean(1)  hasCompNbBits
         if (hasCompNbBits)
            int(5)      CompNbBits;

boolean(1)  hasCompMin
         if (hasCompMin)
            for (int i=0;i<NbComp(quantType))
```

```
              int(QuantNbBits+1)   CompMin[i]
        // no break
     case 3:
        break;
}
```

*4.2 Semantic*

ArrayQP fullfills the same purpose as InitialArrayQP, but in this case, the parameters are optionnaly set. If they are not set in the stream, they are set by default, in reference to the InitialArrayQP or the latest received value of the parameter.

If IPPolicy is 1, the size of the interval between two intras is first specified. In any case, the number of Bits used in Predictive mode (CompNbBits) and the CompMins are coded. The function NbComp() is a function that returns the number of components of the quantizing bounds, is simply depends on the object. For instance is is 3 for 3D positions, 2 for 2D positons, 3 for rotations, etc.

5.0 ArrayOfValues

*5.1 Syntax*

```
class ArrayOfValues {
      ArrayIValue value[0];
      for (int i=1; i < numberOfFields;i++)
      {
           Switch (intraMode) {
                case  0:
                     ArrayPValue value;
                     break;
                case 1:
                     bit (1) isIntra;
                     if (isIntra) {
                          bit(1) hasQP;
                          if (hasQP)
                                ArrayQP qp;
                          ArrayIValue value;
                     } else {
                          ArrayPvalue value;
                     }
                     break;
                case 2:
                     if ( (i % intraInterval) == 0) {
                          bit(1) hasQP;
                          if (hasQP)
                                ArrayQP qp;
```

```
                            ArrayIValue value;
                    } else {
                            ArrayPvalue value;
                    }
                    break;
        }
}
```

*5.2 Semantic*

The array of values first codes a first intra value, and then according to the IPPolicy, codes Intra and Predictive values. In P only mode, no more intra values are coded. In the second mode, a bit decides of the P or I mode at each value. In that case, a QP can be sent for Intra values. If a QP is sent, the statistics of the arithmetic encoder are reset. In the third mode, an Intra is sent every intraInterval values.

6.0 ArrayIValue

*6.1 Syntax*

```
class AnimationIValue(FieldData field) {
    switch (field.animType) {
        case  9: // Normal
            int(1)          direction
        case 10: // Rotation
            int(2)          orientation
            break;
        default:
            break;
    }
    for (j=0;j<getNbComp(field);j++)
        int(QuantNbBits)   vq[j];
}
```

*6.2 Semantic*

The ArrayIValue represents the quantized intra value of a field. The value is coded following the quantization process described in the quantization section, and according to the type of the field. For normals the direction and orientation values specified in the quantization process are first coded. For rotations only the orientation value is coded. If the bit representing the direction is 0, the normal's direction is set to 1, if the bit is 1, the normal's direction is set to $-1$. The value of the orientation is coded as an unsigned integer using 2 bits. The compressed components vq[i] of the field's value are then coded as a sequence of unsigned integers using the number of bits specified in the field data structure. The decoding process in intra mode computes the animation values by applying the inverse quantization process.

7.0 ArrayPValue

*7.1 Syntax*

```
class ArrayPValue(FieldData field) {
    switch (field.animType) {
        case  9: // Normal
            int(1)       inverse
            break;
        default:
            break;
    }
    for (j=0;j<getNbComp(field);j++)
    int(aacNbBits)    vqDelta[j];
}
```

7.2 Semantic

The ArrayPValue represents the difference between the previously received quantized value and the current quantized value of a field. The value is coded using the compensation process as described above.

The values are decoded from the adaptive arithmetic coder bitstream with the procedure v_aac = aa_decode(model). The model is updated with the procedure model_update(model, v_aac). For normals the inverse value is decoded through the adaptive arithmetic coder with a uniform, non-updated model. If the bit is 0, then inverse is set to 1, the bit it is 1, inverse is set to –1. The compensation values vqDelta[i] are then decoded one by one. Let vq(t-1) the quantized value decoded at the previous frame and v_aac(t) the value decoded by the frame's Adaptive Arithmetic Decoder at instant t with the field's models. The value a time t is obtained from the previous value as follows :

What is claimed is:

1. A computer-implemented method of uniformly encoding a video stream, the method comprising the steps of:
   (a) determining, for substantially each data type used in a video stream, a corresponding, type-specific quantization parameters;
   (b) selecting a first value from a first array of one of the data types used in the video stream;
   (c) quantizing the first value using the corresponding, type-specific quantization parameters;
   (d) selecting a second value from the first array of one of the data types used in the video stream;
   (e) determining a predicted value from the first value and the second value using the corresponding, type-specific quantization parameters;
   (f) quantizing the predicted value using the corresponding, type-specific quantization parameters;
   (g) encoding the quantized first value and the quantized predicted value into the video stream; and
   (h) repeating steps (b)–(g) for substantially all arrays to be encoded in the video stream.

2. The method according to claim 1, further comprising the step of encoding header information into the video stream.

3. The method according to claim 1, further comprising the step of decoding the video stream encoded in steps (g) and (h).

* * * * *